United States Patent
Finschi

(10) Patent No.: US 9,212,030 B2
(45) Date of Patent: Dec. 15, 2015

(54) METHOD OF SELECTING ENERGY SETTINGS FOR TRANSPORTATION SYSTEMS

(75) Inventor: Lukas Finschi, Ebikon (CH)

(73) Assignee: Inventio AG, Hergiswil NW (CH)

( * ) Notice: Subject to any disclaimer, the term of this patent is extended or adjusted under 35 U.S.C. 154(b) by 691 days.

(21) Appl. No.: 13/597,005

(22) Filed: Aug. 28, 2012

(65) Prior Publication Data

US 2013/0056312 A1 Mar. 7, 2013

(30) Foreign Application Priority Data

Aug. 30, 2011 (EP) ..................................... 11179324

(51) Int. Cl.
| | | |
|---|---|---|
| B66B 1/16 | (2006.01) | |
| B66B 25/00 | (2006.01) | |
| B66B 1/30 | (2006.01) | |
| B66B 1/24 | (2006.01) | |

(52) U.S. Cl.
CPC ............... *B66B 25/00* (2013.01); *B66B 1/2416* (2013.01); *B66B 1/302* (2013.01); *B66B 2201/103* (2013.01); *B66B 2201/216* (2013.01); *Y02B 50/225* (2013.01)

(58) Field of Classification Search
CPC ...... B66B 1/302; B66B 1/2416; B66B 25/00; B66B 2201/103; B66B 2201/216; Y02B 50/225
USPC ................. 187/247, 380–388, 396, 391–393; 198/321, 322, 330, 334
See application file for complete search history.

(56) References Cited

U.S. PATENT DOCUMENTS

| | | | | |
|---|---|---|---|---|
| 4,631,467 A | * | 12/1986 | Herrmann et al. ............ | 318/798 |
| 4,738,346 A | * | 4/1988 | Matsueda et al. ............. | 198/330 |
| 5,892,190 A | | 4/1999 | Morita et al. | |
| 6,293,368 B1 | * | 9/2001 | Ylinen et al. .................. | 187/382 |
| 6,351,096 B1 | * | 2/2002 | Jang .............................. | 318/811 |
| 6,481,535 B1 | * | 11/2002 | Fargo et al. ................... | 187/382 |
| 6,776,264 B2 | * | 8/2004 | Tyni et al. ..................... | 187/382 |
| 6,935,467 B1 | * | 8/2005 | Tyni et al. ..................... | 187/382 |
| 7,275,623 B2 | * | 10/2007 | Tyni et al. ..................... | 187/382 |
| 7,546,906 B2 | * | 6/2009 | Tyni et al. ..................... | 187/382 |
| 7,694,781 B2 | * | 4/2010 | Sorsa et al. ................... | 187/382 |
| 7,909,143 B2 | * | 3/2011 | Tyni et al. ..................... | 187/382 |
| 8,132,652 B2 | * | 3/2012 | Hakala et al. ................. | 187/249 |
| 8,172,042 B2 | * | 5/2012 | Wesson et al. ................ | 187/382 |
| 8,387,756 B2 | * | 3/2013 | Laihanen et al. ............. | 187/387 |
| 2014/0166434 A1 | * | 6/2014 | Liang et al. ................... | 198/322 |

FOREIGN PATENT DOCUMENTS

| | | |
|---|---|---|
| CN | 201 236 092 Y | 5/2009 |
| JP | 2000 198649 A | 7/2000 |
| JP | 2000 198653 A | 7/2000 |

OTHER PUBLICATIONS

European Search Report issued in corresponding European patent application No. 11179324.6. Search complete date Feb. 1, 2012.

* cited by examiner

*Primary Examiner* — Anthony Salata
(74) *Attorney, Agent, or Firm* — Stroock & Stroock & Lavan LLP

(57) ABSTRACT

Energy efficiency settings for an elevator installation can be determined based on, for example, a start floor for a trip, a destination floor for a trip, user identity information and/or a condition associated with one or more users. In at least some cases, portions of a building (e.g., one or more floors) are associated with one or more energy settings. In further cases, an occupant of a building is associated with one or more elevator energy settings. Some embodiments can be used with an escalator installation.

23 Claims, 6 Drawing Sheets

METHOD OF SELECTING ENERGY SETTINGS FOR TRANSPORTATION SYSTEMS

CROSS-REFERENCE TO RELATED APPLICATION

This application claims priority to European Patent Application No. 11179324.6, filed Aug. 30, 2011, which is incorporated herein by reference.

FIELD

This disclosure relates to energy consumption in transportation systems, such as elevator systems and escalator systems.

BACKGROUND Generally, there are many advantages to improving energy efficiency in buildings. Sometimes improved efficiency can be realized in an elevator system or in an escalator system.

SUMMARY

Various embodiments of the disclosed technologies allow for determining elevator energy efficiency settings based on, for example, a start floor for a trip, a destination floor for a trip, and/or a condition associated with one or more users. In at least some cases, portions of a building (e.g., one or more floors) are associated with one or more energy settings. In further cases, an occupant of a building is associated with one or more elevator energy settings. Further embodiments can be applied to escalator systems.

In some embodiments of a transportation system method (the transportation system comprising an elevator installation or an escalator installation), the method comprises: receiving, using an input device, trip information for a trip for at least one passenger using the elevator installation or using the escalator installation, the trip information comprising elevator trip information if the transportation system comprises the elevator installation, and the trip information comprising escalator trip information if the transportation system comprises the escalator installation; and selecting, based at least in part on the trip information and using a computer, an energy setting out of a plurality of energy settings, for at least a portion of the trip in at least one elevator car in the elevator installation or on at least one escalator of the escalator installation.

In further embodiments, the transportation system comprises the elevator installation, and the trip information comprises the elevator trip information. The elevator trip information comprises at least one of a destination floor, a start floor, a group of floors, a tenant identifier, a passenger energy setting, and identifying information for the at least one passenger. The elevator trip information can comprise a destination floor and a start floor. The elevator trip information can comprise the passenger energy setting. The method can further comprise determining the passenger energy setting based at least in part on identifying information for the at least one passenger.

In additional embodiments, the transportation system comprises the escalator installation, and the trip information comprises the escalator trip information. The escalator trip information can comprise user identity information. The escalator trip information can comprise a user energy setting.

In some embodiments, the method further comprises applying the selected energy setting to the elevator installation or to the escalator installation during the at least a portion of the trip. The method can further comprise selecting the energy setting based at least in part on one or more time-based rules and/or one or more conflict rules. The method can further comprise selecting the energy setting based at least in part on a traffic level in the transportation system.

An exemplary embodiment of a transportation system comprises: at least one elevator car or at least one escalator; an input device; and a computer-based elevator control unit coupled to the input device and coupled to the at least one elevator car or to the at least one escalator, the control unit being configured to receive, from the input device, trip information for at least one passenger using the transportation system, the trip information comprising elevator trip information if the transportation system comprises the at least one elevator car and the trip information comprising escalator trip information if the transportation system comprises the at least one escalator, and select, based at least in part on the trip information, an energy setting for operating the at least one elevator car or the at least one escalator.

An embodiment of an elevator method comprises: receiving, using an elevator installation input device, elevator trip information for a trip for at least one passenger using an elevator installation; and selecting, based at least in part on the elevator trip information and using a computer, an energy setting out of a plurality of energy settings for at least a portion of the trip in at least one elevator car in the elevator installation.

An embodiment of an elevator installation comprises: at least one elevator car disposed in a shaft; an elevator input device; and a computer-based elevator control unit coupled to the elevator input device and to the at least one elevator car, the control unit being configured to receive, from the elevator input device, elevator trip information for at least one passenger using the elevator installation, and select, based at least in part on the elevator trip information, an energy setting for operating the at least one elevator car.

An embodiment of an elevator component comprises: a computer-based elevator control unit coupled to the elevator input device and to the at least one elevator car, the control unit being configured to receive, from the elevator input device, elevator trip information for at least one passenger using the elevator installation, and select, based at least in part on the elevator trip information, an energy setting for operating the at least one elevator car.

An embodiment of an escalator method comprises: obtaining a user energy setting for at least one escalator trip; selecting, based at least in part on the user energy setting, an escalator energy setting for an escalator; and applying the selected escalator energy setting to the escalator for at least a portion of the at least one escalator trip. The method can further comprise obtaining user identity information, the obtaining the user energy setting being based at least in part on the user identity information.

An embodiment of an escalator installation comprises: at least one escalator; at least one identification device; and a computer-based escalator control coupled to the at least one escalator and to the at least one identification device, the escalator control being configured to obtain a user energy setting for at least one escalator trip, to select, based at least in part on the user energy setting, an escalator energy setting for an escalator, and to apply the selected escalator energy setting to the escalator for at least a portion of the at least one escalator trip.

An embodiment of an escalator control component comprises: at least one processor; and one or more computer-readable storage media having encoded thereon instructions which, when executed by the at least one processor, cause the at least one processor to obtain a user energy setting for at least one escalator trip, to select, based at least in part on the user energy setting, an escalator energy setting for an escalator, and to apply the selected escalator energy setting to the escalator for at least a portion of the at least one escalator trip.

At least some embodiments of the disclosed methods can be implemented using a computer or computer-based device that performs one or more method acts, the computer having read instructions for performing the method acts from one or more computer-readable storage media. The computer-readable storage media can comprise, for example, one or more optical disks, volatile memory components (such as DRAM or SRAM), and/or nonvolatile memory components (such as hard drives, Flash RAM or ROM). The computer-readable storage media do not cover pure transitory signals. The methods disclosed herein are not performed solely in the human mind.

BRIEF DESCRIPTION OF THE DRAWINGS

The disclosure refers to the following figures, in which.

DETAILED DESCRIPTION

Figure 1:
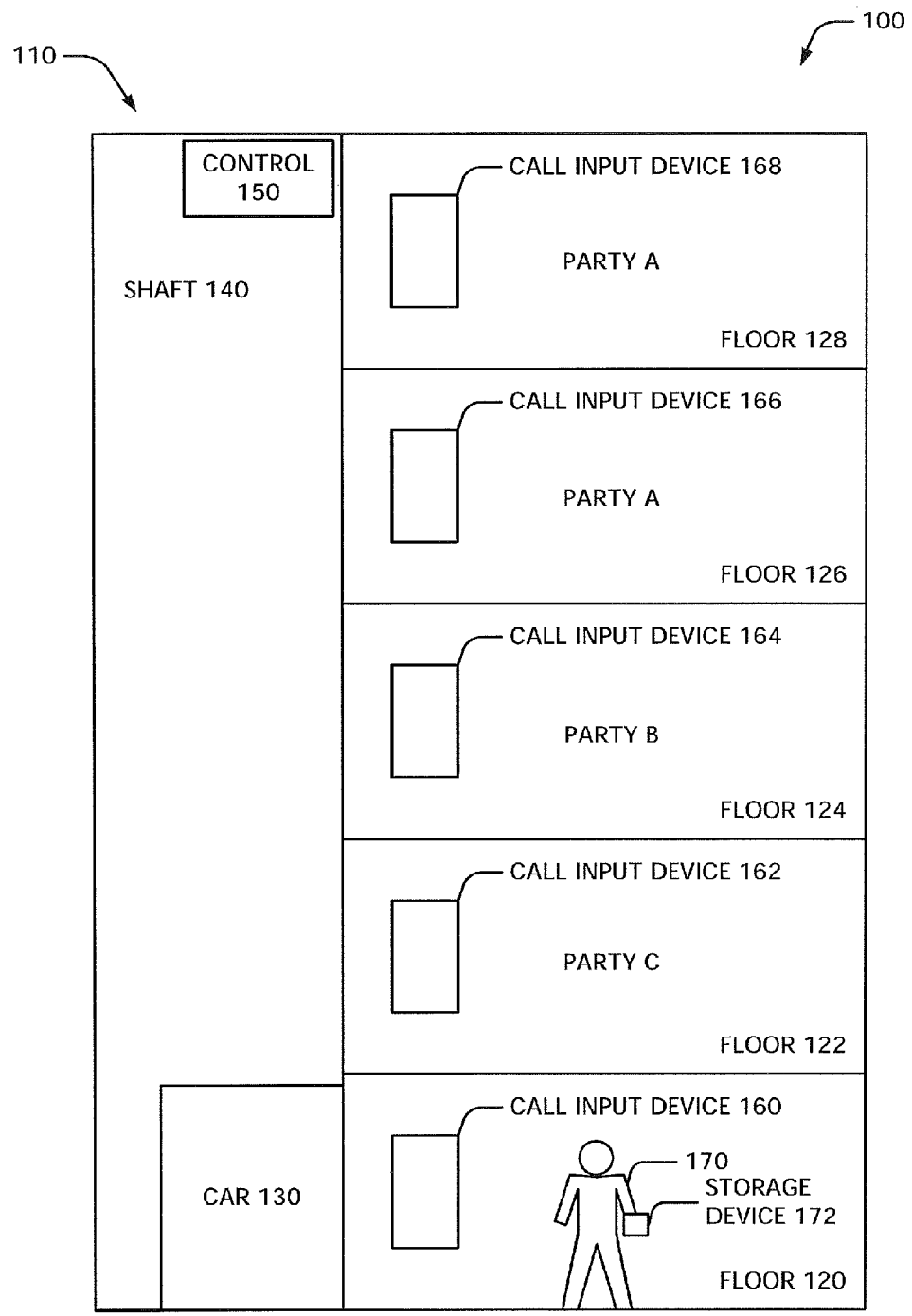
FIG. 1 is a block diagram of an exemplary embodiment of a building having an elevator installation.

FIG. 1 shows a block diagram of an exemplary embodiment of a building 100 having an elevator installation 110. The building 100 comprises a plurality of floors 120, 122, 124, 126, 128, which are served by the elevator installation 110. An elevator car 130 moves within a shaft 140 to reach the various floors 120, 122, 124, 126, 128. The car 130 can be moved using various components, which (to improve clarity) are not shown in FIG. 1. Operation of the elevator installation 110 is controlled by a control unit 150. The control unit 150 comprises, for example, at least one processor and at least one computer-readable storage medium that stores instructions for the processor. In FIG. 1, the floors 122, 124, 126, 128 are depicted as being occupied by various parties (e.g., residents, companies and/or other organizations), namely, Party A, Party B or Party C. At least some of the disclosed embodiments can be applied to situations where one or more floors are occupied by multiple parties, or where all floors are occupied by a single party.

In at least some embodiments, the control unit 150 receives destination call signals from one or more destination call input devices 160, 162, 164, 166, 168, which are arranged on one or more of the floors 120, 122, 124, 126, 128, respectively. Generally, destination call input technology allows a destination for a user 170 (also referred to herein as a "passenger") to be determined before the user 170 enters the car 130. Such technology is sometimes referred to as "destination call control." In some cases, a data storage device 172 (e.g.: an RFID (radio-frequency identification) card, including near-field and far-field devices; magnetic storage devices (e.g., magnetic strip cards); optical code devices) is used to transmit to the elevator installation 110 identifying information associated with the user 170. Based on the identifying information, the control unit 150 determines a destination for the user 170. In further embodiments, the user 170 (identified or unidentified) can input a destination using a destination call input device 160, 162, 164, 166, 168. In embodiments where the installation 110 comprises multiple elevator cars in multiple respective shafts (not shown in FIG. 1), the control unit 150 assigns the user 170 to a particular elevator car and communicates this assignment to the user 170. At least some embodiments of the disclosed technologies can be used with elevator systems having multiple cars in an elevator shaft, including double-deck elevator systems. The control unit 150 directs the car 130 to carry the user 170 to the destination.

Further embodiments of disclosed technologies can be used with elevator systems that do not use destination-call-control technology. Such systems include, for example, elevator systems that allow a user to input a destination from inside the elevator car (e.g., using a button panel inside the car).

Although the user 170 is depicted in FIG. 1 and elsewhere herein as being a person, in various embodiments the user 170 can also be multiple people, a machine, an animal, a good and/or another object for transportation with the elevator installation or within an escalator installation.

The elevator installation 110 can be operated with varying degrees of energy efficiency. For example, moving the elevator car 130 at a higher speed may result in lower energy efficiency than moving the car 130 at a lower speed. A "high-efficiency" elevator trip may differ from a "low-efficiency" elevator trip based on, for example, wait time and/or intermediate stops. In further embodiments, the energy consumption (and thus the energy efficiency) of an elevator trip can be affected by one or more other factors. An exemplary, non-exclusive list of possible factors includes: an acceleration value for an elevator car during a trip; a jerk value for an elevator car during a trip; drive-curve characteristics for an elevator trip (e.g., the characteristics could be different for the start and end of a trip, and/or could depend on the load of the car); occupancy rate of the car (e.g., more or fewer passengers); settings for car components that consume power, such as car fans, car climate control, car lighting, car music systems, car multimedia systems; operation speed of doors; how wide doors are opened (e.g., fully or partially); and/or delays in car departure.

Figure 2:
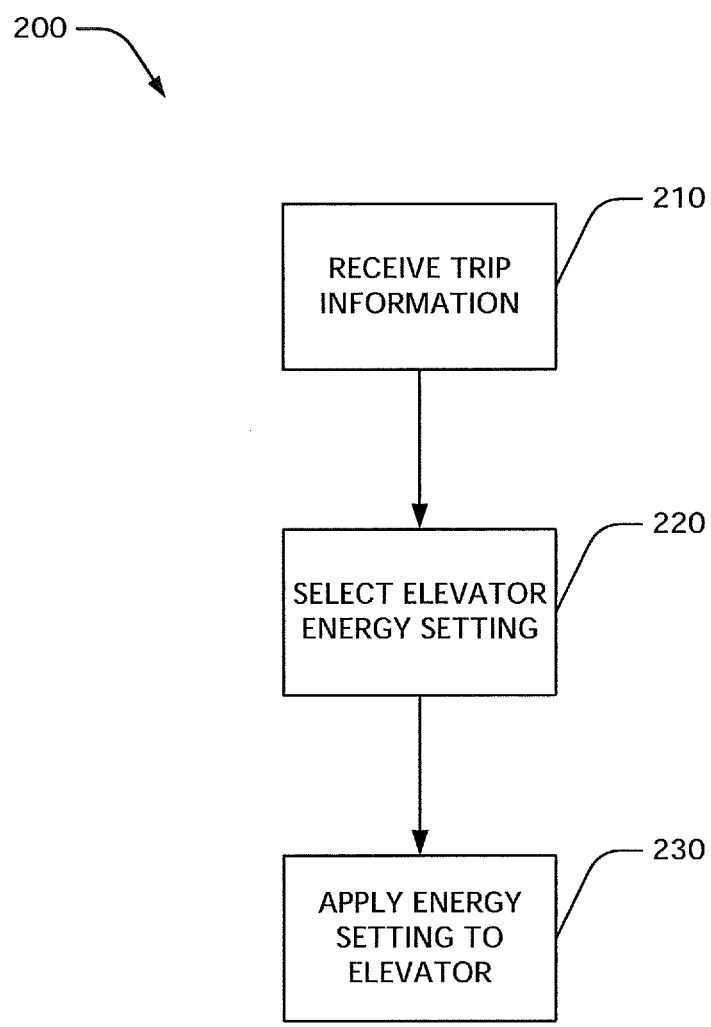
FIG. 2 is a block diagram of an exemplary embodiment of a method for determining energy settings for a trip in an elevator installation.

FIG. 2 shows an exemplary embodiment of a method 200 for determining energy settings for a user trip in an elevator installation, such as the installation 110. In a method act 210, the control unit 150 (or another computer) receives elevator trip information for the user 170 through an input device (e.g., a destination call input device 160, 162, 164, 166, 168; a car operating panel; an RFID scanner; an optical code scanner). The elevator trip information includes one or more of a start floor, a destination floor, user identifying information (e.g., a user name or a number associated with a user) and a user energy setting. In further embodiments, the elevator trip information comprises a group of floors or a tenant identifier (e.g., a tenant name).

The user energy setting comprises, for example, an indication of one or more conditions that affect the energy efficiency of a trip for the user. In various cases, the user energy preference can indicate: that the user's trip always has a low energy efficiency; that the user's trip always has a high energy efficiency; that the user's trip is subject to one or more time constraints (e.g., minimum and/or maximum wait time; minimum and/or maximum travel time; minimum and/or maximum transfer time);

whether the user is to be handled as a VIP (very important person) or as a non-VIP; and/or a precedence level for the user's settings relative to the settings of one or more other users. The user energy setting can comprise one or more indications for energy efficiency (on/off, a degree of efficiency, etc.) and/or indications for energy efficiency for one or more possible factors (for example, car movement speed, door movement settings, and/or in-car systems such as lighting or music).

In some cases, the user energy setting is not communicated directly through the input device. Instead, identifying information for the user is received through the input device. A user energy setting is then retrieved from a database using the identifying information.

In a method act 220, the control unit 150 (or another computer) selects an elevator energy setting based at least in part on the elevator trip information. The elevator energy setting indicates, for example, at what level of energy efficiency (e.g., what relative or absolute level of energy consumption) the elevator and/or one or more components of the elevator should be operated for the trip (or part of the trip). Various embodiments can have different numbers of energy efficiency levels (e.g., "low-efficiency," "high-efficiency"). Each level can be associated with one or more operating parameters for the elevator installation. For example, a "low-efficiency" level can be associated with a relatively high cabin speed, while a "high-efficiency" level can be associated with a relatively low cabin speed. In various embodiments, the efficiency can be varied by changing one or more of the factors discussed here.

In some embodiments, an energy setting can be selected from a database of pre-determined energy settings profiles. Each of the profiles can indicate operating parameters (e.g., specific values or ranges of values, on/off values) for one or more elevator system components (e.g., car movement speed, door movement speed, brightness of cabin lighting, presence of cabin multimedia). In further embodiments, at least some of the energy settings profiles are based on recent or current measurements of energy use in the elevator installation (e.g., the amount of energy consumed by one or more installation components over a given period of time). In additional embodiments, at least some of the energy settings profiles are based on simulated values and/or on calibration and testing performed when the elevator installation is installed. The energy settings profiles can also comprise respective indications of how much energy the elevator installation would use, or likely use, when operating according to that profile. Accordingly, the control unit 150 (or another computer) can select a profile with a certain level of energy consumption (e.g., a certain level of energy efficiency). In further embodiments, an energy setting can be selected in other ways.

Unless explicitly stated otherwise, settings described herein (e.g., energy efficiency levels, aspects of user energy preferences) are not necessarily limited to one or two levels or options, but can also encompass three or more levels or options. For example, an energy efficiency level can be selected from "high" and "low" in one embodiment, while in another embodiment the level can be selected from "high," "medium-high," "medium," "medium-low" and "low."

The method act 220 can be performed in various ways. In some embodiments, the energy setting can be chosen based on the start floor. In further embodiments, the energy setting can be chosen based on the destination floor. In additional embodiments, the energy setting can be chosen based on the user energy setting and/or the user identifying information. In other embodiments, the energy setting can be chosen based on a combination of one or more of these data.

In a method act 230, the selected energy setting is applied to an elevator during at least a portion of an elevator trip for the user 170.

Figure 3:
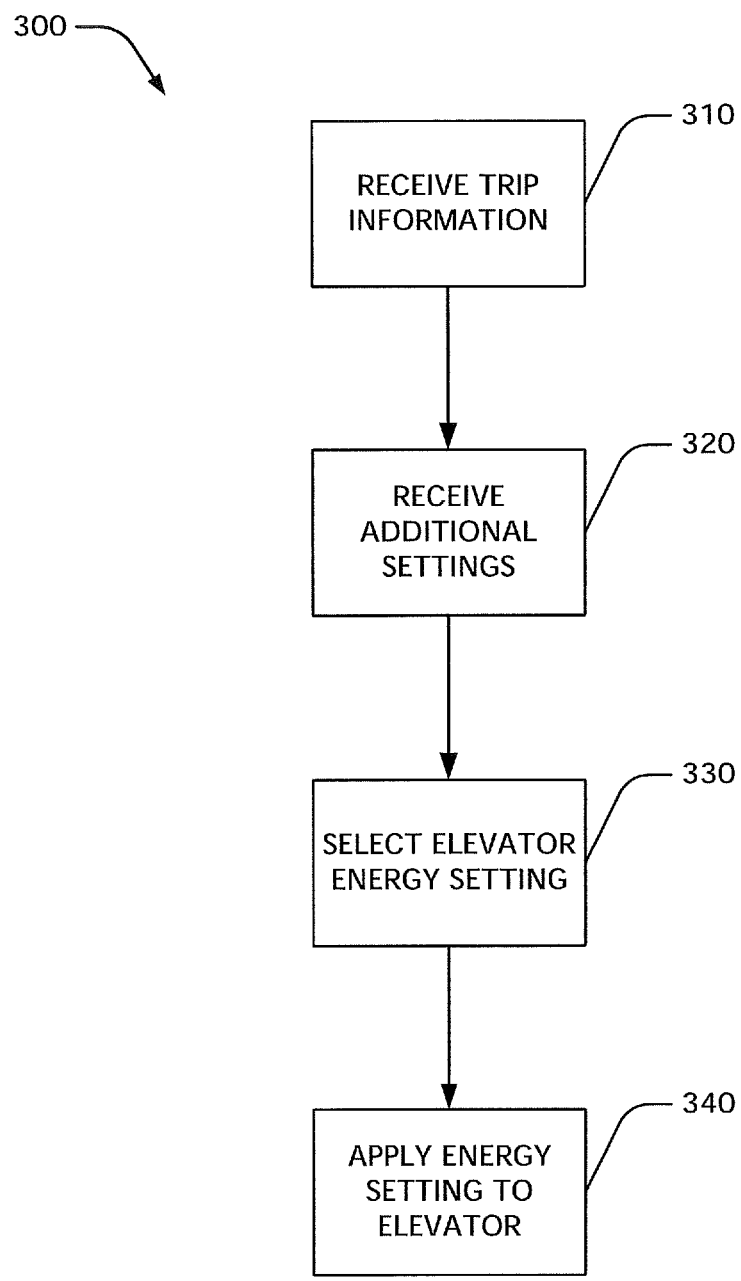
FIG. 3 shows a block diagram of another exemplary embodiment of a method for determining energy settings for a trip in an elevator installation.

FIG. 3 shows a block diagram of another exemplary embodiment of a method 300 for determining energy settings for a trip in an elevator installation, such as the installation 110. In a method act 310, elevator trip information is received for a user. The trip information includes one or more of a start floor, a destination floor, a user energy setting, a group of floors, a tenant identifier and passenger identifying information. In a method act 320, additional settings are received by the elevator installation (examples of such additional settings are discussed below). In a method act 330, the elevator energy setting for the user trip is selected based on the trip information and based on the additional settings. In a method act 340, the selected energy setting is applied to an elevator during at least a portion of the user trip.

In some cases, the additional settings comprise one or more time factors that can be used to choose the energy setting. For example, time-based rules can indicate when high-efficiency and/or low-efficiency energy levels can be selected. Low-efficiency energy levels may be required or favored during certain periods (e.g., during peak-traffic hours, when handling traffic quickly is a high priority), and high-efficiency energy levels may be required or favored during other periods (e.g., during low-traffic times).

In further cases, the additional settings comprise one or more traffic-level factors that can be used to choose the energy setting. For example, if a high level of passenger traffic is detected or expected in the elevator system, then a low-efficiency energy level may be required or favored. If a low level of passenger traffic is detected or expected in the elevator system, then a high-efficiency energy level may be required or favored.

In further cases, the additional settings comprise one or more service settings that can be used to determine the energy setting. Service settings can include, for example: facility-management override; maintenance override; emergency override; fire override; and/or cleaning override.

In further embodiments, conflicts can arise between settings for a destination floor and a start floor. For example, for a given trip, a start floor may be associated with a low-efficiency energy level, while a destination floor may be associated with a high-efficiency energy level. Such conflicts can be resolved using one or more conflict rules. For example, a rule may state that the lower-efficiency energy level of the start and destination floors is used, or that the higher-efficiency energy level of the start and destination floors is used. Another rule may state that an intermediate energy level is used.

In additional embodiments, conflicts can arise between settings for two or more passengers. These conflicts can arise from elevator trip information for the two or more passengers. For example, a destination or start floor for a first passenger can require a low-efficiency energy level, while a destination or start floor for a second passenger can require a high-efficiency energy level. In another example, a user energy setting for a first passenger is different from a user energy setting for a second passenger. In some cases, the elevator system can resolve such conflicts by assigning the passengers to different elevator trips. In other cases, the elevator system assigns the passengers to the same trip and applies one or more rules to resolve the conflict. For example, one or more settings can be treated as "default" settings that are applied in case of such a conflict (e.g., a high-efficiency energy level is used in case of conflict). In some cases, a user may have a "tolerant" setting that defers to the settings of other users. For example, a given user may not require a high-efficiency energy level, but the user's tolerant setting allows for a trip with this level if another user requires it. In further cases, the settings of VIP users can take precedence over the settings of non-VIP users.

One or more similar rules can also be used to resolve conflicts based on the additional settings described above.

In at least some embodiments, one or more rules for conflict resolution can be applied to each of the energy-related settings.

In particular embodiments, one or more settings can be determined by one or more parties served by an elevator installation (e.g., Party A, Party B, Party C of FIG. 1). For example, a tenant can indicate that one or more passengers, going to and/or leaving a floor at least partially occupied by the tenant, should be associated with one or more energy settings (e.g., a high-efficiency energy level or a low-efficiency energy level). As another example, a tenant can indicate that one or more persons associated with the tenant (e.g., employees of the tenant, guests of the tenant) should be associated with one or more energy settings. Such settings can also be modified by one or more other parties, such as a facilities manager and/or owner.

At least some versions of the disclosed technologies allow for monitoring of energy usage of the elevator installation. Generally, energy usage in embodiments disclosed herein can be measured using one or more metering devices. The energy usage for a given trip can be associated with one or more tenants, passengers and/or other parties. The system can track, for example, what percentage of users taking the elevator to or from a floor occupied by Party B used trips with high-efficiency energy levels. Such energy usage information can be used by a tenant, a facilities manager and/or an owner to adjust energy usage settings, possibly to meet a desired level of energy usage. The information can also be used to adjust settings to meet a desired level of energy costs and/or to motivate tenants to conserve energy.

Figure 4:
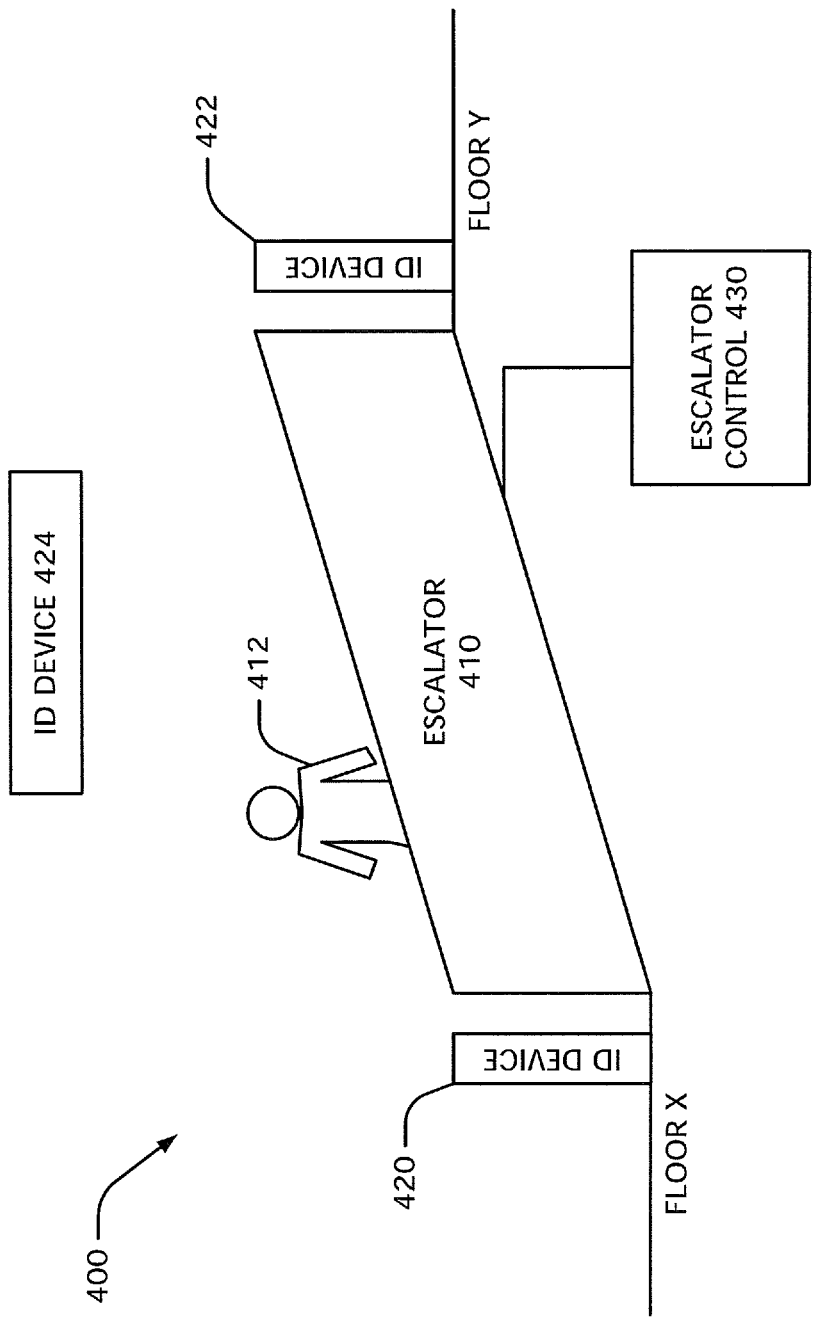
FIG. 4 shows a block diagram of an exemplary embodiment of an escalator installation.

Further embodiments of the disclosed technologies can be used with escalator installations. FIG. 4 shows a block diagram of an exemplary embodiment of an escalator installation 400. The installation 400 comprises an escalator 410 that moves one or more passengers 412 between Floor X and Floor Y. The operation of the escalator 410 is controlled by a computer-based escalator control 430. The passenger 412 is identified by one or more input devices (e.g., ID devices 420, 422, 424). The ID devices 420, 422 identify the passenger 412 as he or she enters and/or leaves the escalator 410 and are positioned near an entrance or exit of the escalator 410. The ID device 424 is not positioned near an entrance or exit of the escalator 410, but still allows for identifying the passenger 412 and determining that the passenger is near or on the escalator 410. The ID devices 420, 422, 424 can identify the passenger 412 based on, for example, an RFID device or other data-storage device borne by the passenger, based on one or more biometric readings, and/or based on other techniques.

Figure 5:
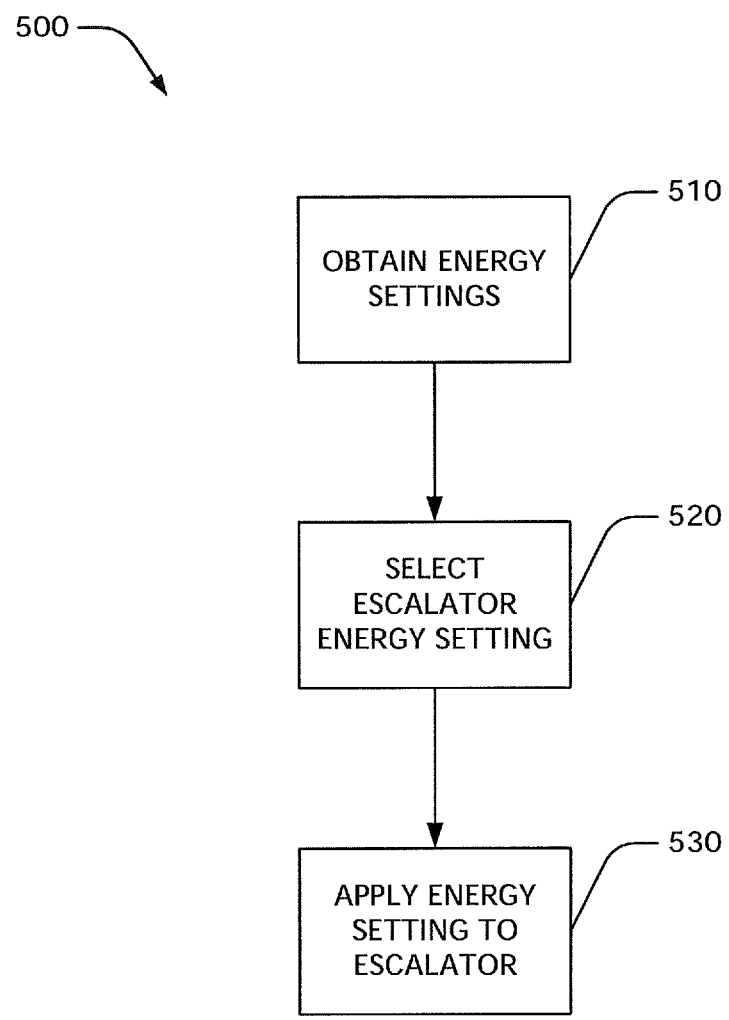
FIG. 5 shows a block diagram of an exemplary embodiment of a method for determining energy settings for a user trip with an escalator.

FIG. 5 shows a block diagram of an exemplary embodiment of a method 500 for determining energy settings for a user trip with an escalator. The method 500 can be performed by, for example, the escalator control 430. In a method act 510, trip information, such as energy settings for one or more passengers and/or identification information of the one or more passengers, is obtained. In some cases the energy settings can be obtained, for example, from a data carrier borne by the passenger (e.g., an RFID card, including near-field and far-field devices; magnetic storage devices (e.g., magnetic strip cards); optical code devices). In other cases the energy settings are obtained from a database using an identification of the user determined by the ID devices 420, 422, 424. At least some of the user energy settings can be similar to those described above for elevator systems. This method act can be performed using at least one of the ID devices 420, 422, 424.

In a method act 520, an energy setting is selected for the escalator. The escalator energy setting indicates, for example, at what level of energy efficiency the escalator should be operated for at least part of the trip. Various embodiments can have different numbers of energy efficiency levels (e.g., "low-efficiency," "high-efficiency"). Each level can be associated with one or more operating parameters for the escalator installation 400. For example, a "low-efficiency" level can be associated with a relatively high escalator speed, while a "high-efficiency" level can be associated with a relatively low escalator speed. In a method act 530, the selected energy setting is applied to the escalator for at least a portion of a trip with the escalator.

In further embodiments, additional settings (possibly similar to at least some of those described above for the method 300) can be used in selecting the escalator energy setting. In still further embodiments, one or more rules can be used to resolve conflicts that arise between settings for multiple passengers and/or between settings for a passenger and other settings.

Although some embodiments of the various methods disclosed herein are described as comprising a certain number of method acts, further embodiments of a given method can comprise more or fewer method acts than are explicitly disclosed herein. In additional embodiments, one or more method acts are performed in and order other than disclosed herein.

Figure 6:
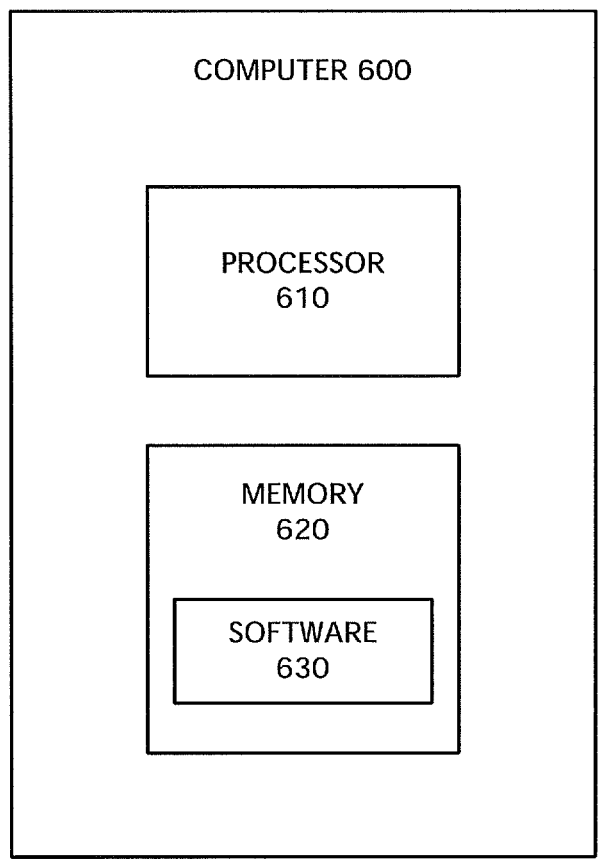
FIG. 6 is a block diagram of an exemplary embodiment of a computer.

FIG. 6 shows a block diagram of an exemplary embodiment of a computer 600 (e.g., part of an elevator control, part of an escalator control) that can be used with one or more technologies disclosed herein. The computer 600 comprises one or more processors 610. The processor 610 is coupled to a memory 620, which comprises one or more computer-readable storage media storing software instructions 630. When executed by the processor 610, the software instructions 630 cause the processor 610 to perform one or more method acts disclosed herein. Further embodiments of the computer 600 can comprise one or more additional components.

Following is an exemplary, non-limiting example of an application of an embodiment of the method 200. The example is described in reference to FIG. 1. A user 170 enters a building 100 that has an elevator installation 110. The user works for Party A, which is a tenant in the building. Party A is a company that has indicated that it prefers to have its guests and/or employees use the elevator installation 110 with an energy-efficient setting. This could be for various reasons: perhaps the company wishes to reduce electricity costs; perhaps a limited amount of energy is available, and Party A wishes to conserve the available energy; and/or perhaps Party A wishes to be or be seen as an environmentally conscious organization.

In some versions of this example, the control unit 150 recognizes the user's identity based on, for example, an RFID card 172 carried by the user 170. Further recognizing that the user 170 is associated with Party A, the control unit 150 selects an energy-efficient elevator energy setting ("high-efficiency") for the user's trip in the car 130.

In further versions of this example, the control unit 150 selects an energy setting based on the user's start floor and/or destination floor. For example, if the user 170 indicates that he or she wishes to be taken to the floor 128, which is occupied by Party A, then the control unit 150 selects an energy-efficient elevator setting for the trip. When the user later takes the elevator to leave a floor occupied by Party A, the user's start floor is associated with energy-efficient settings. Accordingly, an energy-efficient setting is chosen for the elevator trip starting at that floor. On the other hand, if the user's destination floor and/or start floor is in an area of the building that is not associated with energy-efficient settings, then in some cases a non-energy-efficient elevator setting is selected for the trip. For example, the destination floor may be floor 124, which is occupied by Party B. In this example, Party B has chosen to have at least some trips to and/or from its floor associated with non-energy-efficient settings.

In some cases, a given party that occupies multiple portions of a building (e.g., two or more floors, or two or more groups of floors) can choose to have only some of those portions associated with energy-efficient elevator settings.

At least some embodiments of the disclosed technologies can allow for more flexible management of energy use in elevator installations. For example, the energy-conservation interests of different parties in a building can be addressed by allowing one party to focus on energy-efficient use of the elevator installation, while allowing another party to focus on other aspects (e.g., speed of elevator use, short waiting times).

Following is an exemplary, non-limiting example of an application of an embodiment of the method 500. This example is described in reference to FIG. 4. A user 412 approaches an escalator 410 from Floor X. The ID device 420 reads information from an RFID card carried by the passenger 412. Based on the read information, the escalator control 430 reads the user's energy setting from a database. The energy setting indicates that the user 412 should be transported with the escalator using a low-efficiency energy setting (e.g., at a relatively high escalator speed), so that the user can travel quickly. The control 430 applies this energy setting to the escalator 410 for the user's trip.

At least some embodiments of the disclosed technologies can allow for more flexible management of energy use in escalator installations. For example, the energy-conservation interests of different parties in a building can be addressed by allowing one party to focus on energy-efficient use of the escalator installation, while allowing another party to focus on other aspects (e.g., moving speed of the escalator).

Having illustrated and described the principles of the disclosed technologies, it will be apparent to those skilled in the art that the disclosed embodiments can be modified in arrangement and detail without departing from such principles. In view of the many possible embodiments to which the principles of the disclosed technologies can be applied, it should be recognized that the illustrated embodiments are only examples of the technologies and should not be taken as limiting the scope of the invention. Rather, the scope of the invention is defined by the following claims and their equivalents. I therefore claim as my invention all that comes within the scope and spirit of these claims.

The invention claimed is:

1. A transportation system method, the transportation system comprising an elevator installation or an escalator installation, the method comprising:
    receiving, using an input device, trip information for a trip for at least one passenger using the elevator installation or using the escalator installation, the trip information comprising elevator trip information if the transportation system comprises the elevator installation, or the trip information comprising escalator trip information if the transportation system comprises the escalator installation;
    selecting, responsive to predetermined criteria and the trip information, a predetermined energy setting from a plurality of energy settings; and
    utilizing the predetermined energy setting from the plurality of energy settings to transport, for at least a portion of the trip, at least one elevator car in the elevator installation or at least one escalator of the escalator installation.

2. The transportation system method of claim 1, the transportation system comprising the elevator installation, and the trip information comprising the elevator trip information.

3. The transportation system method of claim 2, the elevator trip information comprising at least one of a destination floor, a start floor, a group of floors, a tenant identifier, a passenger energy setting, and identifying information for the at least one passenger.

4. The transportation system method of claim 3, the elevator trip information comprising a destination floor and a start floor, the method further comprising utilizing the destination floor or the start floor to obtain the predetermined energy setting which is associated with the destination floor or the start floor.

5. The transportation system method of claim 3, the elevator trip information comprising the passenger energy setting, the method further comprising utilizing the passenger energy setting as the predetermined energy setting.

6. The transportation system method of claim 1, further comprising utilizing identifying information for the at least one passenger to obtain the predetermined energy setting which is associated with the at least one passenger.

7. The transportation system method of claim 1, the transportation system comprising the escalator installation, and the trip information comprising the escalator trip information.

8. The transportation system method of claim 7, the escalator trip information comprising user identity information and the method further comprising utilizing the user identity information to obtain the predetermined energy setting which is associated with the user identity information.

9. The transportation system method of claim 7, the escalator trip information comprising a user energy setting and the method further comprising utilizing the user energy setting as the predetermined energy setting.

10. The transportation system method of claim 1, further comprising applying the predetermined energy setting to the elevator installation or to the escalator installation during the at least a portion of the trip.

11. The transportation system method of claim 1, wherein selecting the predetermined energy setting further comprises utilizing an energy setting based at least in part on one or more time-based rules.

12. The transportation system method of claim 1, wherein selecting the predetermined energy setting further comprises selecting the predetermined energy setting from one of a plurality of predetermined settings associated with the trip information based at least in part on one or more conflict rules.

13. The transportation system method of claim 1, wherein selecting the predetermined energy setting further comprises selecting the predetermined energy setting based at least in part on a traffic level in the transportation system.

14. A transportation system comprising:
    at least one elevator car or at least one escalator;
    an input device; and a computer-based elevator control unit coupled to the input device and coupled to the at least one elevator car or to the at least one escalator, the control unit being programmed to, receive, from the input device, trip information for at least one passenger using the transportation system, the trip information comprising elevator trip information if the transportation system comprises the at least one elevator car and the trip information comprising escalator trip information if the transportation system comprises the at least one escalator, select, responsive to predetermined criteria and the trip information, a predetermined energy setting from a plurality of energy settings; and utilize the predetermined energy setting for operating the at least one elevator car or the at least one escalator.

15. One or more computer-readable storage media having encoded thereon instructions that, when executed by a processor, cause the processor to perform a method, the method comprising:

receiving, from an input device, trip information for at least one passenger using a transportation system, the trip information comprising elevator trip information if the transportation system comprises at least one elevator car and the trip information comprising escalator trip information if the transportation system comprises at least one escalator;

selecting, responsive to predetermined criteria and the trip information, a predetermined energy setting from a plurality of energy settings; and utilizing the predetermined energy setting for operating the at least one elevator car or the at least one escalator.

16. A method, comprising:

receiving, using an input device, trip information for a first elevator passenger trip;

selecting, responsive to predetermined criteria and the trip information for the first elevator passenger trip, a first predetermined energy setting out of a plurality of energy settings;

executing the first elevator passenger trip by operating an elevator installation using the first predetermined energy setting;

receiving, using the input device, trip information for a second elevator passenger trip;

selecting, responsive to the predetermined criteria and the trip information for the second elevator passenger trip, a second predetermined energy setting out of the plurality of energy settings, the second predetermined energy setting being different from the first predetermined energy setting; and executing the second elevator passenger trip by operating the elevator installation using the second predetermined energy setting.

17. The method of claim 16, the trip information for the first elevator passenger trip comprising user identity information and the first predetermine energy setting is associated with the user identity information.

18. The method of claim 16, the trip information for the first elevator passenger trip comprising a destination call and the first predetermined energy setting is associated with a start floor or a destination floor of the destination call.

19. The method of claim 16, the trip information for the first elevator passenger trip comprising occupant information for a starting floor or a destination floor and the first predetermined energy setting is associated with the occupant information.

20. The transportation system method of claim 1, wherein selecting the predetermined energy setting comprises selecting the predetermined energy setting from a database of predetermined energy settings profiles.

21. The transportation system of claim 14 wherein the computer-based elevator control unit comprises a database of predetermined energy settings profiles, and the predetermined energy setting is selected from the database of predetermined energy settings profiles.

22. The one or more computer-readable storage media of claim 15, wherein selecting the predetermined energy setting comprises selecting the predetermined energy setting from a database of predetermined energy settings profiles.

23. The method of claim 16, wherein selecting the first predetermined energy setting and the second predetermined energy setting comprises selecting the first predetermined energy setting and the second predetermined energy setting from a database of predetermined energy settings profiles.

* * * * *